United States Patent [19]

Thornber

[11] Patent Number: 5,542,027
[45] Date of Patent: Jul. 30, 1996

[54] FUZZY SYLLOGISTIC SYSTEM

[75] Inventor: Karvel K. Thornber, Berkeley Heights, N.J.

[73] Assignee: NEC Research Institute, Inc., Princeton, N.J.

[21] Appl. No.: 341,794

[22] Filed: Nov. 18, 1994

Related U.S. Application Data

[62] Division of Ser. No. 166,793, Dec. 13, 1993, Pat. No. 5,392,383, which is a continuation of Ser. No. 759,489, Sep. 13, 1991, abandoned.

[51] Int. Cl.$^6$ ................................................. G06F 17/00
[52] U.S. Cl. .................................. 395/61; 395/3; 395/900
[58] Field of Search ................................. 395/3, 10–11, 395/15, 50–51, 61, 900; 364/513, 807

[56] References Cited

U.S. PATENT DOCUMENTS

| | | | |
|---|---|---|---|
| 4,875,184 | 10/1989 | Yamakawa | 395/3 |
| 5,058,033 | 10/1991 | Bonissone et al. | 395/61 |
| 5,142,664 | 8/1992 | Zhang | 395/3 |
| 5,295,226 | 3/1994 | Yamakawa | 395/3 |

OTHER PUBLICATIONS

Delgado et al, "Direct inference with labels using generalized 'Modus Ponens'." Proceedings. First internatioanl symposium on uncertainty modeling and analysis, pp. 477–482, 3–5 Dec. 1990.

Hayashi et al, "Efficient method for multi-dimensional fuzzy reasoning and its application to fault diagnosis"; Artificial intelligence for industrial applications conference, pp. 27–32, 1988.

Primary Examiner—David K. Moore
Assistant Examiner—Tariq Rafiq Hafiz
Attorney, Agent, or Firm—Philip J. Feig

[57] ABSTRACT

A fuzzy syllogistic inference processing system for use with a chain of implications when links in the chain have various measures between 0 and 1 of confidence. Analog signals that are linearly related to the confidence measures are generated and compared. The chain of implications is given a confidence measure that is equal to that of the inference consequence of the last major premise in the chain provided that each major premise in the chain has a confidence measure that is larger than the confidence measure of the complement or negation of its antecedent in the chain.

6 Claims, 3 Drawing Sheets

FUZZY SYLLOGISTIC SYSTEM

This is a division of application Ser. No. 08/166,793 filed Dec. 13, 1993, now U.S. Pat. No. 5,392,383, which is a continuation of application Ser. No. 07/759,489 filed Sep. 13, 1991, now abandoned.

FIELD OF THE INVENTION

This invention relates to fuzzy information processing systems and to such systems that use syllogistic techniques to reach conclusions when supplied with fuzzy or imprecise information.

BACKGROUND OF THE INVENTION

In classical logic, a variety of procedures based on logical operations and rules of inference have been developed to proceed from basic premises to logical conclusions. Moreover, these procedures have been the bases for electronic computers that have revolutionized our way of life. These computers typically are based on Boolean algebra and logic depend on quantized binary digits as the input signals and are not well adapted to manipulate input premises that are fuzzy and with a variable range of truth value.

However, in recent years, in response to the need to be able to reach relatively well-defined conclusions with relatively ill-defined or inexact input information, there have been a number of proposals for fuzzy computers or fuzzy information processing systems. Various applications have been proposed for such fuzzy information processing systems, often in control systems where noise and other variables make it impractical to use highly precise signal values.

One such proposal is described in U.S. Pat. No. 4,875,184 which issued on Oct. 17, 1989 to T. Yamakawa and discloses apparatus described as a fuzzy-inference engine that is designed for use as a fuzzy logic computer. As described therein, the computer is quite complex and appears to depend in reaching conclusions on a large memory of assumed relationship values and a form of interpolation of such values.

Moreover, considerable work appears to have been done on developing circuits and components useful for such computers and many are described by T. Yamakawa in a paper entitled "Fuzzy Hardware Systems of Tomorrow" that appeared in a book edited by E. Sanchez and L. A. Zadek entitled "Approximate Reasoning in Intelligent Systems, Decision and Control" published by Pergamon Press (London) 1987. In this paper, nine different fuzzy logic functions are defined in terms of two basic membership functions.

These prior art approaches have tended to depend primarily on detailed input information with little reliance on inferential assumptions and consequently have tended to be complex with a need for very large memories for the storage of detailed information about the relationships between the various components of the information being processed.

The present invention seeks to simplify such complexity and to this end relies more heavily on inferences made with less detailed information at the expense of sometimes concluding no inference is possible from the given antecedents.

SUMMARY OF THE INVENTION

In particular, the invention relies on the concept that the truth or confidence measure of the major premise of the involved syllogism connecting the input premises will be used in the circuitry as the value of the consequent of the inference whenever this truth or confidence measure is larger than the complement (negation) of the truth or confidence measure of the minor premise. The size of this inequality will be termed the fidelity, or measure of validity, of this inference. To this end, it will be necessary to provide values to such truth or confidence measures to the various premises. In some instances, these measures may need to be initially assigned arbitrary values based on expectations but improved values may be learned with use as is done with neural nets. In other instances, these values may be derived as fuzzy measurements of particular conditions.

To distinguish the invention based on this concept from the prior art approaches in which no comparison is made between the truth measure of the inference and the complement of the truth measure of the minor premise to derive the fidelity, the invention will be described as a fuzzy syllogistic system.

The use of this concept allows such a system to be characterized by a considerable simplification in the electronics involved. A key feature of a system in accordance with the invention is a circuit to be called an inference block in which separate input terminals are provided with a first analog input signal whose current amplitude is linearly related to the truth measure of the minor premise and with a second analog input signal whose current amplitude is linearly related to the truth measure of the major premise, to yield a first output whose amplitude is that of the second input so long as the second input is at least as great as the value of the complement of the first input, and preferably greater than the value of the complement by a prescribed amount which amount, can be chosen to compensate for noise in the system and a second output which is the difference between the second input and the complement of the first input. If this inequality is not satisfied, it is concluded that the truth value of the minor premise is insufficient to effect an inference from the major premise. In this case the second output, the fidelity, is zero.

The invention will be better understood from the following more detailed description taken in conjunction with the following drawing.

DETAILED DESCRIPTION OF THE INVENTION

Figure 1:
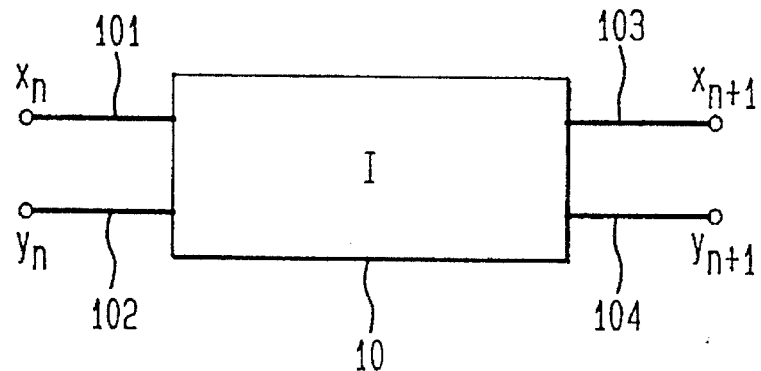
FIG. 1 shows the symbol to be used to designate the inference block that is a basic feature of the invention.

Before discussing the drawing, it will be helpful to begin with an exposition of the novel concepts on which the invention is based. In particular, it will be useful to explore the ramifications of fuzzy inference.

The objective of fuzzy inference is to obtain some properties of the fuzzy functions $B_1$, $B_2$, . . . from similar properties of the fuzzy functions $A_1$, $A_2$, . . . when these functions can be related according to an inference scheme $$A_1, A_2, \ldots \rightarrow B_1, B_2, \ldots \qquad (1)$$

where the A are antecedents and the B consequents of the inference whose truth or confidence measure is between zero and one because of the unavailability of complete information as to the truth of the inference governed by a collection of rules of inference. In classical logic this can be accomplished in a variety of equivalent procedures based on combinations of both logic operations and modus ponens. Extensions of these procedures to fuzzy logic have been less successful: many lack contraposition $(A \Rightarrow B)=(B' \Rightarrow A')$; none reproduce reductio ad absurdum (rada) $(A \Rightarrow B, A \Rightarrow B') \rightarrow A'$. There are, of course, applications where such properties may be inappropriate, even undesirable; however, even the lack of a law of excluded middle should not prevent the formulation of a method of fuzzy inference which captures these fundamentally essential features of classical logic.

In approaching inference it is natural to try to derive conclusions from premises using logic operations. For example, to construct a modus ponens (i.e., assuming the major premise $A \Rightarrow B$ and the minor premise A are valid to conclude B is valid)

$$(A, A \Rightarrow B) \rightarrow B \qquad (2)$$

one could try $$A \wedge (A \Rightarrow B) \qquad (3)$$

or even $$(A \wedge (A \Rightarrow B)) \Rightarrow B \qquad (4)$$

However, in classical logic $(A \wedge (A \Rightarrow B))=(A \wedge B) \neq B$, while $((A \wedge (A \Rightarrow B)) \Rightarrow B)=1$. Thus, while both explanations are understandable, (the first saying that to obtain B, we must have a valid A, the second indicating that this expression is a tautology, valid even if A=B'), neither can really be said to represent the heart of modus ponens. On the other hand, the classical statement, "If A is true and if A implies B is true, then B is true," is simple, direct, and, if B can be extracted (detached) from $A \Rightarrow B$, effective. But, most importantly, it involves an operation outside of the logic operations (and ($\wedge$), or ($\vee$), negation (/), etc.) but of course, not outside of logic. Let us now capture this important aspect in fuzzy logic.

Before proceeding, however, a word about the operation implication is necessary. We shall use $(A \Rightarrow B)=(A' \vee B)$, as if it were just another fuzzy logic connective. As in logic, this expression returns B if A is sufficiently true; otherwise it returns A' meaning A is not true enough. Some authors have modified $A \Rightarrow B$ in order to emphasize one or more aspects of inference, e.g. $(A \Rightarrow B)=(A\alpha B)$. However, we must bear in mind that even though the result of an inference in classical logic can be expressed in the form, "When A is true, B is true," which can be represented by the operation of implication, $A \Rightarrow B$, the two, inference and implication, are two very different concepts. In addition, and as a technical point crucial for what follows, $A\alpha B=1$, $A \leq B$, $=B$, $A>B$ has an inappropriate, logic symmetry to represent $A \Rightarrow B$. To be sure it reduces to the classical $A' \vee B$ for $(A, B)=\{0,1\}^2$. But it is discontinuous along A=B in the very region $((A, B)>\frac{1}{2})$ where $A \Rightarrow B$ is most useful. Indeed, one cannot infer B from A and $A \Rightarrow B$ for A<B. In addition, choosing $A\alpha B$ at once precludes both contraposition and reductio ad absurdum. The choice $(A \Rightarrow B)=(\wedge(1-A+B))$, which, in contrast with $A\alpha B$, does correspond to $A' \vee B$ in the choice of fuzzy logic operations bounded sum and bounded difference for union and intersection, respectively, and which does preserve contraposition, also precludes reductio ad absurdum. Again, the logic symmetry is inappropriate since $(1 \wedge (1-A+B))=1$ for $A \leq B$ and $(1-A+B)$ for $A \geq B$. Though continuous across A=B, it embodies two distinct functional dependences in the region $((A, B)>\frac{1}{2})$ where only one type of dependence would be expected. Again B cannot be inferred from A and $A \Rightarrow B$ for A<B.

To achieve modus ponens for fuzzy logic, we must be able to derive the fuzzy function B from the fuzzy functions A and $A \Rightarrow B$. All fuzzy functions are, of course, functions of elements associated with fuzzy sets, and need not be the same element when taken in combination. For example, we can have $A(x) \Rightarrow B(x)$ or $A(x) \Rightarrow B(y)$ depending on the problem of interest. For sake of brevity we occasionally write $A_x$ for $A(x)$, etc. The logic operation $A \Rightarrow B$ we represent as $A' \vee B$, since this form preserves the meaning of implication: when true, if A is true then B is true. For $A \wedge B$ we choose max (A,B), for $A \wedge B$ we choose min (A,B), for A' we choose 1-A, a common choice since the beginning of fuzzy logic [1], and one which satisfies all the standard properties of logic connectives except the laws of excluded middle and noncontradiction. In what follows $A \vee B$ means the logic OR if reference is to logic, set union if reference is to set theory and max (A,B) if reference is to fuzzy logic. Similarly $A \wedge B$: AND, intersection, min (A,B); A': negation, complement 1-A.

Returning finally to modus ponens, given $(A \Rightarrow B)=\max (A',B)$, clearly if $(A \Rightarrow B)>A'$ then $B=(A \Rightarrow B)$. Thus if we know $(A \Rightarrow B)$ and A, we calculate A'=1-A and compare $(A \Rightarrow B)$ with A'. If the former is strictly larger, then we infer that $B=(A \Rightarrow B)$. We write this as follows:

$$(A, A \Rightarrow B) \rightarrow B = (A \Rightarrow B) >_w A' \qquad (5)$$

where the "$>_w$" symbol (as in $X>_w Y$) reminds us that the preceeding equality is valid whenever X>Y. Note that for $(A \Rightarrow B)=A'$, $B(\leq A')$ is (otherwise) undeterminate. (The case $(A \Rightarrow B)<A'$ is impossible.) Put another way, for B >A', which includes all the most useful region ($\frac{1}{2}<(A,B)\leq 1$), and in fact half of all possible values for (A,B), $0 \leq A'<B \leq 1$, B can be readily extracted from $A \Rightarrow B$. In words this has a strong intuitive ring: the larger A, the smaller $A \Rightarrow B$ need be to trigger inference, or the smaller A, the larger $A \Rightarrow B$ must be to permit inference: $B=(A \Rightarrow B)>_w A'$ captures this inverse relationship.

The advantages of the above procedure include retaining contraposition $((A \Rightarrow B)=(B' \Rightarrow A'))$, due to the retention of $(A \Rightarrow B)=(A' \vee B)$, the dependence of the result on the nature of A as well as $A \Rightarrow B$ (see modus tollens below), and the retention of reductio ad absurdum. Concerning the latter, consider the case where we are given $A \Rightarrow B$ and $A \Rightarrow B'$, both greater than $\frac{1}{2}$, i.e., more true than false. Whatever the value of B, $A'>\frac{1}{2}$, for if $A'<\frac{1}{2}$, min $(A \Rightarrow B, A \Rightarrow B')<\frac{1}{2}$ contrary to assumption. Knowing $A'>\frac{1}{2}$, we find at once that $$A'=\min(A \Rightarrow B, A \Rightarrow B')>_w \frac{1}{2}, \qquad (6)$$

a statement of rada. One can strengthen this result by recognizing that (6) has the form $$A'=(A \Rightarrow B) \wedge (A \Rightarrow B') \qquad (7a)$$

which expands into $$A'=(A \Rightarrow (B \wedge B'))=(A' \vee (B \wedge B')) \qquad (7b)$$

so that for A'>min(B,B')≦½ one obtains rada. Thus the crisper (i.e, closer to 1) B or B' becomes, the wider the range of A'(min(B,B')<A'≦1) that can be inferred using proof by contradiction (rada) (6). Since B is not normally known, (6) is usually the best one can do. Should B be bounded away from ½, then this lower bound can be reduced further. (Note that (7a) also follows from taking the conjunction of the given quantities. Recalling (3) we remember that this is not always a useful procedure.)

There are, of course, occasions where $A \Rightarrow B$ and B' are known. By analogy to modus ponens above, we can construct modus tollens $$(B', A \Rightarrow B) \rightarrow A' = (A \Rightarrow B) >_w B \qquad (8)$$

While $(A \Rightarrow B) > ½$ and $B' > ½$ yield $A' = (A \Rightarrow B)$, in fact (8) can be used to recover A' from the region $0 \leq B < A' \leq 1$ complementary to that covered by modus ponens.

RULES OF INFERENCE

In logic inference can be formulated either in the form of axioms plus modus ponens or in the form of a set of rules of inference including modus ponens. For fuzzy logic, the latter are much more useful, as we shall see when we apply the rules to derive the standard axioms in fuzzy form. Previous workers have labelled each rule of inference in symbolic logic by a logic operation and either the word "introduction" or "elimination," or with quantitifiers "instantiation" or "generalization." Extending these to fuzzy logic, one worker has changed "elimination" to "exploitation." Our rules differ significantly from his, however, since he chose to interpret $A \Rightarrow B$ as AαB. Here we shall simply use the symbol for the operation and the first letter of the appropriate noun.

$\Rightarrow$E: (implication elimination) This is simply our modus ponens ((5) above).

$\Rightarrow$I: (implication introduction) Here we take what we know about A and B to construct
$(A \Rightarrow B) = (A' \vee B)$. (This, of course, is not the only source of fuzzy functions of the form $A \Rightarrow B$.)

~E: (negation elimination) $A'' = 1 - A' = 1 - (1 - A) = A$.

~I: (negation introduction) this is rada (6), i.e., reductio ad absurdum or proof by contradiction, or modus tollens (8), whichever is appropriate.

$\wedge$E: (conjunction elimination) In logic given that $\wedge_k A_k$ is true (1), one infers that $A_k$ is true (1) for each k. In fuzzy logic one is given $\min_k mn_k(A_k) = A_{mn}$ and infers $A_k \geq A_{mn}$ for each k. However, by analogy with $\vee$E (see below), based on modus ponens, we can infer $$(\vee_k(A_k \Rightarrow M), \wedge_l A_l) \rightarrow M = \vee_k(A_k \Rightarrow M) >_w (\wedge_l A_l)' \qquad (9)$$

while based on modus tollens we can infer $$(\vee_k(M \Rightarrow B_k), \wedge_l B'_l) \rightarrow M' = \vee_k(M \Rightarrow B_k) >_w (\wedge_l B'_l)' \qquad (10)$$

$\wedge$I: (conjunction introduction) Here we take $(A_1, A_2 \ldots)$ and form $A_{mn} = mn(A_1, A_2, \ldots) = \wedge_k A_k$.

$\vee$E: (disjunction elimination) In logic this is one of the more interesting rules of inference. Using modus ponens/tollens it is readily extended to fuzzy logic:

$$(\wedge_k(A_k \Rightarrow M), \vee_l A_l) \rightarrow M = \wedge_k(A_k \Rightarrow M) >_w (\vee_l A_l)' \qquad (11)$$

$$(\wedge_k(M \Rightarrow B_k), \vee_l B'_l) \rightarrow M' = \wedge_k(M \Rightarrow B_k) >_w (\vee_l B'_l)' \qquad (12)$$

$\vee$I: (disjunction introduction) Here we take $(A_1, A_2, \ldots)$ and form $A_{mx} = mx(A_1, A_2, \ldots) = \vee_k A_k$.

EXTENSIONS

These rules can be extended in a number of ways. If we interpret the quantifiers for all x, $A_x(\forall_x A_x)$ as $(\wedge_x A_x)$ and there exists if such that $(\exists_y B_y)$ as $(\vee_y B_y)$ then $\forall$E, $\forall$I, $\exists$E, $\exists$I follow at once by analogy with $\wedge$E, $\wedge$I, $\vee$E, $\vee$I above. Thus $$\forall E: (\exists_x(A_x \Rightarrow M), \forall_y A_y) \rightarrow M = \exists_x(A_x \Rightarrow M) >_w (\forall_y A_y)' \qquad (13)$$

$$(\exists_x(M \Rightarrow B_x), \forall_y B'_y) \rightarrow M' = \exists_x(M \Rightarrow B_x) >_w (\forall_y B'_y)' \qquad (14)$$

$$\exists E: (\forall_x(A_x \Rightarrow M), \exists_y A_y) \rightarrow M = \forall_x(A_x \Rightarrow M) >_w (\exists_y A_y)' \qquad (15)$$

$$(\forall_x(M \Rightarrow B_x), \exists_y B'_y) \rightarrow M' = \forall_x(M \Rightarrow B_x) >_w (\exists_y B'_y)' \qquad (16)$$

Of greater interest are the representations of the conditional quantifiers. If we interpret $\forall_x f_x, g_x$, i.e., for all elements x such that $f_x$ is satisfied in a fuzzy sense, then $g_x$ is also satisfied, as $\wedge_x (f_x \Rightarrow g_x) = \wedge_x (f'_x \wedge g_x)$, and $\exists_x f_x g_x$ as $\vee_x (f_x \wedge g_x)$, and noting that $$(\forall_x f_x, g_x)' = \exists_x f_x, g'_x \qquad (17)$$

we obtain at once the following conditional quantifier inferences:

$$\forall_c E: (\exists_x f_x (g_x \Rightarrow B), \forall_y f_y, g_y) \rightarrow \exists_x f_x >_w B = \exists_x f_x (g_x \Rightarrow B) >_w (\forall_y f_y, g_y)' \qquad (18)$$

$$(\exists_x f_x (A \Rightarrow g_x), \forall_y f_y, g'_y) \rightarrow \exists_x f_x >_w A' = \exists_x f_x, (A \Rightarrow g_x) >_w (\forall_y f_y, g'_y)' \qquad (19)$$

$$\exists_c E: (\forall_x f_x (g_x \Rightarrow B), \exists_y f_y, g_y) \rightarrow B = \forall_x f_x, (g_x \Rightarrow B) >_w (\exists_y f_y, g_y)' \qquad (20)$$

$$(\forall_x f_x (A \Rightarrow g_x), \exists_y f_y, g'_y) \rightarrow A' = \forall_x f_x (A \Rightarrow g_x) >_w (\exists_y f_y, g'_y)' \qquad (21)$$

As in (13)–(16), (18) and (20) generalize modus ponens, (19) and (21) modus tollens.

In symbolic logic one often expresses hypotheses in the following form $$H = ((A_1 \wedge A_2 \wedge \ldots \wedge A_n) \Rightarrow B), \qquad (22a)$$

the negation of which is $$H' = A_1 \wedge A_2 \wedge \ldots \wedge A_n \wedge B' \qquad (22b)$$

If H' is true (the set $(A_1, A_2, \ldots, A_n, B')$ consistent), then H is false (not valid); if H' is false (the set inconsistent), then H is true (valid). With our interpretation of the operation of fuzzy implication, we can manipulate (22ab) much as is done in logic to obtain analogous results.

Examples of this include the following. If $$H_{12} = ((A_1 \wedge A_2) \Rightarrow (B_1 \vee B_2)), \qquad (23a)$$

then by a straightforward manipulation $$H_{12} = ((A_1 \wedge B'_2) \Rightarrow (B_1 \vee A'_2)) \qquad (23b)$$

In this manner, one obtains a number of implications having the same (known) fuzzy truth value. Of particular interest is to write (22a) as $$H = ((A_2 \wedge \ldots \wedge A_n \wedge B') \Rightarrow A'_1) \qquad (24)$$

In logic, if one also has $A_2 \wedge \ldots \wedge A_n \Rightarrow A_1$, then using modus tollens it follows from (24) that $$H = (A_2 \wedge \ldots \wedge A_n \Rightarrow B) \qquad (25)$$

Hence, within a set propositions implied by other propositions can be omitted in hypothesis such as (22a). In fuzzy logic, owing to the continuous nature of the operations, it is necessary that $((A_2 \wedge \ldots \wedge A_n) \Rightarrow B) > ((A_2 \wedge \ldots \wedge A_n) \Rightarrow A'_1)$ Expression (25) then remains valid since from (24)

$$H = (\overline{A}_2 \Rightarrow (B \vee A'_1)) = (\overline{A}_2 \Rightarrow B) \vee (\overline{A}_2 \Rightarrow A'_1) = (\overline{A}_2 \Rightarrow B) >_w (\overline{A}_2 \Rightarrow A'_1), \qquad (26)$$

where $\overline{A}_2 = A_2 \wedge \ldots \wedge A_n$.

In proving theorems, more easily proved lemmas are often used in order to shorten the proof. This technique can be formalized using the cut rule $$(A_1 \Rightarrow (B_1 \vee R_{12}), (A_2 \wedge R_{12}) \Rightarrow B_2) \rightarrow ((A_1 \wedge A_2) \Rightarrow (B_1 \vee B_2)) \qquad (27)$$

where $R_{12}$ is the cut formula (lemma of $A_1$) of this inference, the conclusion (result) of which does not involve $R_{12}$ explicitly. Longer chains of reasoning are readily envisioned $$(A_1 \Rightarrow (B_1 \wedge R_{12}), (R_{12} \wedge A_2) \Rightarrow B_2, A_2 \Rightarrow (B_2 \vee R_{23}), R_{23} \wedge A_3 \Rightarrow B_3) \rightarrow (A_1 \wedge A_2 \wedge A_3 \Rightarrow B_1 \vee B_2 \vee B_3) \qquad (28)$$

Note that even in fuzzy logic the two intermediate terms can be combined as $$(R_{12} \wedge A_2 \Rightarrow B_2) \vee (A_2 \Rightarrow B_2 \vee R_{23}) = (R_{12} \wedge A_2 \Rightarrow B_2 \vee R_{23}), \qquad (29)$$

which has the same structure as (27).

In order to determine the nature of the inference (27) in fuzzy logic, we consider the simpler (actually equivalent) inference $$(u \vee v, u' \vee w) \rightarrow (v \vee w) \qquad (30)$$

Clearly $(v \vee w) \leq mx(u \vee v, u' \vee w) = mx(u, v, u', w)$. If $(u \vee v) > u > (u' \vee w)'$ then we would have equality. However, merely from $(u \vee v)$ and $(u' \vee w)$, we cannot guarantee both these strict inequalities. Now, so long as $(u \vee v) > (u' \vee w)'$, it follows that $$mn(u \vee v, u' \vee w) \leq (v \vee w) \leq mx(u \vee v, u' \vee w). \qquad (31)$$

This is appropriate, as the conjunction of the antecedent implications in (30) would be expected to play a key role here. If, in addition to (30), we also have $$(t \vee v, t' \vee w) \rightarrow (v \vee w), \qquad (32)$$

with $(t \vee v) > (t' \vee w)'$, then the limits in (31) can be tightened to $$mx(mn(u \vee v, u' \vee w), mn(t \vee v, t' \vee w)) \leq (v \vee w) \leq mx((u \wedge t) \vee v, (u \vee t)' \vee w) \qquad (33)$$

These results, (31) and (33), differ from our previous results in that here we have not explicitly identified the consequent of the inference in terms of the antecedent, we have only bounded it. Since this is indeed a fuzzy logic, this limitation should not seem too unnatural.

We can now return to the cut rule (27). if we identify $A'_1 \vee B_1$ with $v, A'_2 \vee B_2$ with $w$, and $R_{12}$ with $u$, then $v \vee w = (A_1 \wedge A_2) \Rightarrow (B_1 \vee B_2)$, and with these entries (31) yields $$mn(A_1 \Rightarrow (B_1 \vee R_{12}), (A_2 \wedge R_{12}) \Rightarrow B_2) \leq (A_1 \wedge A_2) \Rightarrow (B_1 \vee B_2) \leq mx(A_1 \Rightarrow (B_1 \vee R_{12}), (A_2 \wedge R_{12}) \Rightarrow B_2) \qquad (34)$$

so long as $(A_1 \Rightarrow (B_1 \vee R_{12})) > (A_2 \wedge R_{12} \Rightarrow B_2)'$. Similarly (28) works out to be $$mn(A_1 \Rightarrow (B_1 \wedge R_{12}), R_{12} \wedge A_2 \Rightarrow B_2 \vee R_{23}, R_{23} \wedge A_3 \Rightarrow B_3) \leq \qquad (35)$$

$$(A_1 \wedge A_2 \wedge A_3 \Rightarrow B_1 \vee B_2 \vee B_3) \leq$$

$$mx(A_1 \Rightarrow B_1 \wedge R_{12}, R_{12} \wedge A_2 \Rightarrow B_2 \vee R_{22}, R_{23} \wedge A_3 \Rightarrow B_3)$$

provided $(A_1 \Rightarrow (B_1 \vee R_{12})) > ((R_{12} \wedge A_2) \Rightarrow (B_2 \vee R_{23}))'$ and $((R_{12} \wedge A_2) \Rightarrow (B_2 \vee R_{23})) > ((R_{23} \wedge A_3) \Rightarrow B_3)'$.

(The inequalities in (34) and (35) are sharp, however many A and B are considered). Longer chains can be similarly analyzed and the bounds tightened with alternative lemmas.

A common variant of the cut rule (27) is the following minor extension:

$$(A_1 \Rightarrow B_1 \vee R_2, R_2 \wedge A_2 \Rightarrow B_2) \rightarrow (A_1 \wedge (R_1 \Rightarrow R_2) \wedge A_2) \Rightarrow (B_1 \vee B_2) \qquad (36)$$

where, of course $R_1 \Rightarrow R_2$ is understood to be a third antecedent. This can be decomosed and analyzed in much the same manner as (28), with the result that $$mn(A_1 \Rightarrow B_1 \vee R_1, R_1 \Rightarrow R_2, R_2 \wedge A_2 \Rightarrow B_2) \leq \qquad (37)$$

$$(A_1 \wedge (R_1 \Rightarrow R_2) \wedge A_2) \Rightarrow (B_1 \vee B_2) \leq$$

$$mx(A_1 \Rightarrow B_1 \vee R_1, R_1 \Rightarrow R_2, R_2 \wedge A_2 \Rightarrow B_2)$$

so long as $(A_1 \Rightarrow B_1 \vee R_1) > (R_1 \Rightarrow R_2)'$ and $(R_1 \Rightarrow R_2) > (R_2 \wedge A_2 \Rightarrow B_2)'$. Various simplifications of (27) or (36) lead to exact results. For example $$(A_1 \wedge A_2 \Rightarrow R \vee B, S \wedge A_1 \wedge A_2 \Rightarrow B) \rightarrow (A_1 \wedge (R \Rightarrow S) \wedge A_2 \Rightarrow B) \qquad (38)$$

according to $$(A_1 \wedge (R \Rightarrow S) \wedge A_2 \Rightarrow B) = mn(A_1 \wedge A_2 \Rightarrow R \vee B, S \wedge A_1 \wedge A_2 \Rightarrow B) \qquad (39)$$

while $A_2 \Rightarrow (B_2 \vee (A_1 \Rightarrow B_1)) = (A_1 \wedge A_2) \Rightarrow (B_1 \vee B_2)$, again owing to our choice of $A \Rightarrow B = A' \vee B$.

As an extension of $\vee E$, one can encounter this modus-ponens-like inference $$(\{A_j \Rightarrow B_j\}, \vee_i A_i) \rightarrow \vee_i B_i \qquad (40)$$

By analogous reasoning we find $$(\vee_i A_i)' <_w mn_k(A_k \Rightarrow B_k) \leq \vee_i B_i \leq mx_k(A_k \Rightarrow B_k) \qquad (41)$$

While $mx_k(A_k \Rightarrow B_k) = mx_k(A'_k) \vee mx_i(B_i)$, so that if one knew $\wedge_k A_k$, one could write $$\vee_i B_i = \vee_k (A_k \Rightarrow B_k) >_w (\wedge_k A_k)', \qquad (42)$$

this would not be too useful, as some $A_k$ can be 0. Rather, it is the inequality $$\wedge_k (A_k \Rightarrow B_k) \leq \vee_i B_i$$

which lies at the heart of 41). The equivalent expression using modus tollens is $$(\{A_i \Rightarrow B_i\}, \vee_j B'_j) \rightarrow \vee_j A'_j \qquad (43)$$

and $$(\vee_k B'_k) <_w mn_k(A_k \Rightarrow B_k) \leq \vee_j A'_j \leq mx_i(A_i \Rightarrow B_i). \qquad (44)$$

Once again one could have $$\vee_j A'_j = mx_i(A_i \Rightarrow B_i) >_w \vee_l B_l,$$

but as above this form has minimal utility.

Another common inference in logic (transitivity) has the form $$(A \Rightarrow X_1, X_1 \Rightarrow X_2, \ldots, X_n \Rightarrow B) \rightarrow A \Rightarrow B \qquad (45)$$

We can use our fuzzy modus ponens (5) to pass from A to B so long as the following inequalities are satisfied:

$$A' < (A \Rightarrow X_1), (A \Rightarrow X_1)' < (X_1 \Rightarrow X_2), \ldots,$$
$$(X_{n-1} \Rightarrow X_n)' < (X_n \Rightarrow B) \qquad (46)$$

From these we infer $X_s = (X_{s-1} \Rightarrow X_s)$ and $B = (X_n \Rightarrow B)$. Similarly using modus tollens (8) and $$B' > (X_n \Rightarrow B)', (X_n \Rightarrow B) > (X_{n-1} \Rightarrow X_n)', \ldots, (X_1 \Rightarrow X_2) > (A \Rightarrow X)'$$

we infer $X'_r = (X_r \Rightarrow X_{r+1})$ and $A' = (A' \Rightarrow X_1)$. (Note that the intermediate inequalities are the same as those above.) Should B and C be joined by $Y_1 \ldots Y_m$ similarly satisfying $$B' < (B \Rightarrow Y_1), (B \Rightarrow Y_1)' < (Y_1 \Rightarrow Y_2), \ldots, (Y_{m-1} \Rightarrow Y_m)' < (Y_m \Rightarrow C),$$

then this meshes with series (46) and $C = (Y_m \Rightarrow C)$.

These results illustrate a number of interesting features. So long as the intermediate inequalities are satisfied, the derived implication $$(A \Rightarrow_d B) = (A \Rightarrow X_1, X_n \Rightarrow B), \qquad (47)$$

now represented by two quantities, does not depend upon the actual values of $(X_1 \Rightarrow X_2), \ldots, (X_{n-1} \Rightarrow X_n)$. In other words, the successive influences do not dilute the inference. While (47) cannot be reduced to the simpler form $(A \Rightarrow B) = (A' \vee B)$, it does enable us to preserve the most important feature of the classical result. In (45) if A is true, then $X_1$ is true, if $X_1$ is true, then $X_2$ is true, ..., if $X_n$ is true then B is true: hence if A is true, B is true, and (43) indeed simplifies to $A \Rightarrow B$. Similarly, if $(A \Rightarrow X_1) > A'$, then $B = (X_n \Rightarrow B)$ summarizes (46). (It is this encapulation which is not possible with the simpler form $A' \vee B$.) If we are working with quantified quantities, then $(\forall_l (X_s \Rightarrow X_{s+1})_l) > (\forall_k (X_{x-1} \Rightarrow X_s)_k)'$ guarantees $(X_s \Rightarrow X_{s+1})_l > (X_{s-1} \Rightarrow X_s)_l$ for each 1, and (47) becomes $$(A \Rightarrow_d B) = (\forall_l (A \Rightarrow X_1)_l, \forall_k (X_n \Rightarrow B)_k)$$

Thus for each x, $A_x > (\wedge_l (A \Rightarrow X_1)_l)'$, $B_x \geq \wedge_k (X_n \Rightarrow B)_k$, using the minimization interpretation of universal quantification introduced above.

Perhaps the most counterintuitive result here is that some of the $(X_s \Rightarrow X_{s+1})$ can in principle be less than ½ without affecting the overall inference. (Clearly if each exceeds ½, all inequalities are immediately satisfied.) Thus all that is required of $(X_s \Rightarrow X_{s+1})$ is that it exceeds $(X_{s-1} \Rightarrow X_s)'$ and $(X_{s+1} \Rightarrow X_{s+2})'$ which can be quite small. In general, no two adjacent implications can be less than ½. However, given strong implications on either side, this model permits a weak implication in between representing an "intuitive-leap" (a tunneling-inference-space) phenomenon. (Mathematically this results from making full use of the B>1−A region of the $0 \leq A \leq 1, 0 \leq B \leq 1$ domain over which $A \Rightarrow B$ is defined.) Should a weak implication enter, the system could search for a stronger connective, as would a person in a similar situation. However, one would still have the result, found initially more quickly and simply but so it would seem with less rigor. Of course, if appropriate, a lower limit (e.g. ½) can be imposed ad hoc on the individual implications. In any event one is not restricted to a monotonically increasing sequence of $A, X_1, X_2, \ldots, X_n, B$, though such could be imposed if warranted.

Closely related to the above is fuzzy mathematical induction: $(F_1, F_{n-1}) \rightarrow F_n$, or more precisely, $(F_1, F_n \Rightarrow F_{n+1}) \rightarrow F_{n+1}$. So long as $F_n$ and $(F_n \Rightarrow F_{n+1})$ remain above ½, then $F_{n+1} > ½$, and all is well. However, should $(F_n \Rightarrow F_{n+1})$ drop below ½, induction would cease. To avoid this deadlock, one should switch to $G_{n+1} = F'_{n+1}$ so that $(F_n \Rightarrow G_{n+1}) > ½$. Should $(G_m \Rightarrow G_{m+1}) < ½$ for some m>n+1, one simply switches back to $F_{m+1} = G'_{m+1}$ so that $(G_m \Rightarrow F_{m+1}) > ½$. One can continue in this manner to all countable m, n.

One should carefully distinguish inference and decision theory. In the latter one usually carries out explicit operations to determine an output which elicits a decision. In the former, by contrast, one relies on implicit operations. For example modus ponens goes into $A \Rightarrow B$ to note that if $1 \Rightarrow 0$ is 0 and $1 \Rightarrow 1$ is 1, then A=1 and $A \Rightarrow B = 1$ means that B=1; values of $A \Rightarrow B$ for A=0 are not needed for this inference. This going inside of, this implicit-function dependence (given x and f(x,y), find y), is what inference is all about.

With this background we can discuss circuit implementations of fuzzy syllogistic systems in accordance with the invention.

First FIG. 1 shows a symbol 10 to be used for representing the basic inference function involved. It comprises input terminals 101 and 102 supplied with input signals $X_n$ and $Y_n$ and output terminals 103 and 104 supplying output with signals $X_{n+1}$ and $Y_{n+1}$. $X_n$ corresponds to an analog signal with an amplitude between 0 and 1 that is a measure of the truth, or confidence, of the minor premise involved. $Y_n$ corresponds to an analog signal with an amplitude between 0 and 1 that is a measure of the truth, or, confidence, of the major premise. $X_{n+1}$ corresponds to an analog signal that is a measure of the bounded difference between $Y_n$ and $X'_n$ where $X'_n$ is the negation or complement $(1-X_n)$ of $X_n$. (This difference has been referred to as the fidelity or degree of validity of the inference $Y_{n+1}$.) $Y_{n+1}$ is equal to $Y_n$ but is valid only if $X_{n+1}$ is greater than some arbitrary threshold, which may be as small as zero, although it may be chosen to have a positive value to compensate for noise or other factors to increase the reliability of the inference.

Figure 2:
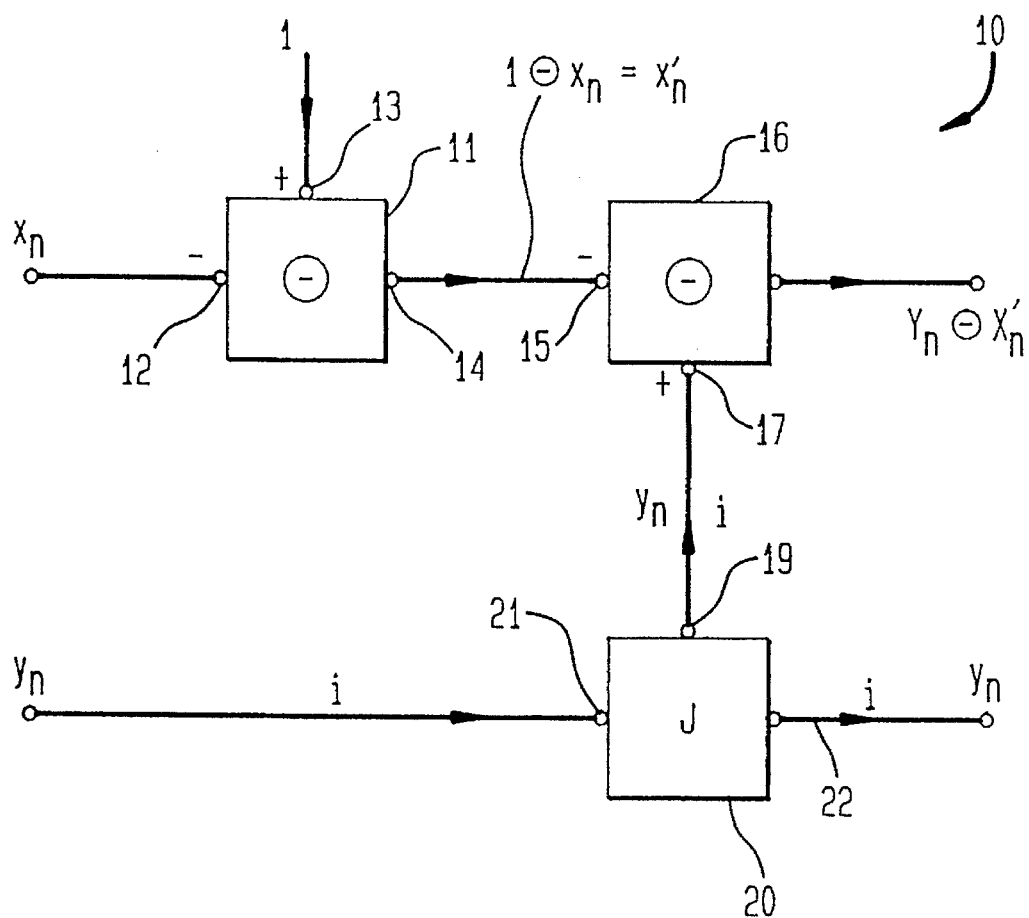
FIG. 2 shows in block schematic form the components of an inference block.

FIG. 2 shows in block schematic one form of circuit suitable for carrying out the function represented by symbol 10 of FIG. 1. It includes a bounded difference circuit 11 to which is supplied at its negative input terminal 12 with the current value of $X_n$ and at positive input terminal 13 with a current of unit value to provide at its output $X'_n$ the complement or negation of $X_n$. The output terminal 14 of circuit 11 is directly connected to the negative terminal 15 of a bounded difference circuit 16 similar to circuit 11 whose positive input terminal 17 is supplied by the input current $Y_n$. In the circuit depicted, the input current $Y_n$ is supplied by way of an output terminal 19 of a current amplifier 20 whose input terminal 21 is supplied with current $Y_n$. The current amplifier 20 also provides a replica of this current at its output terminal 22. At terminal A there is available the difference $Y_n - X'_n$ which is termed the fidelity measure of the implication. Unless the analog signal value $Y_n$ exceeds the analog signal value $X'_n$ by some prescribed value adequate to compensate for the noise in the system, the fidelity measure has value zero and no inference is possible. If $Y_n$ does exceed $X'_n$ adequately, the inference is valid and the analog value $Y_n$ is the value of the confidence measure of the desired consequent of the implication. The fidelity of a consequent has particular importance in a chain of inferences since a consequent becomes the antecedent in the next link of the chain. The use of the current amplifier 20 make $Y_n$ available for use in additional circuitry, as will be explained below. If this replica of $Y_n$ is not needed, $Y_n$ could be directly supplied to input terminal 17 without the insertion of the current amplifier 20.

Each of circuits 11, 16 and 20 can be of any form known in the art suitable for such functions. Examples of such circuits are described in the previously identified paper and patent of T. Yamakawa. It can be noted that circuits 11 and 16 basically are subtracting circuits.

Figure 3:
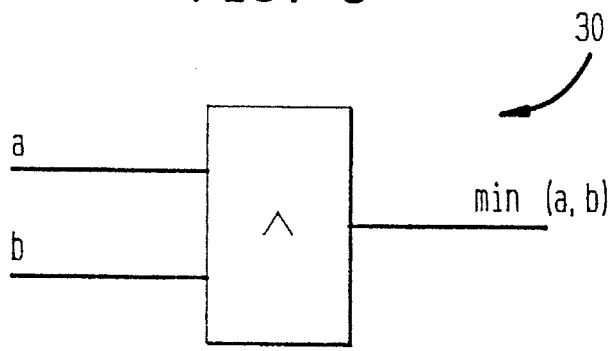
FIG. 3 shows the symbol to be used for a particular circuit important to the invention when a chain of implications is involved.

FIG. 3 shows another block symbol 30 to be used for representing a circuit which, when provided with inputs a and b, will provide as the output the smaller of the two.

Figure 4:
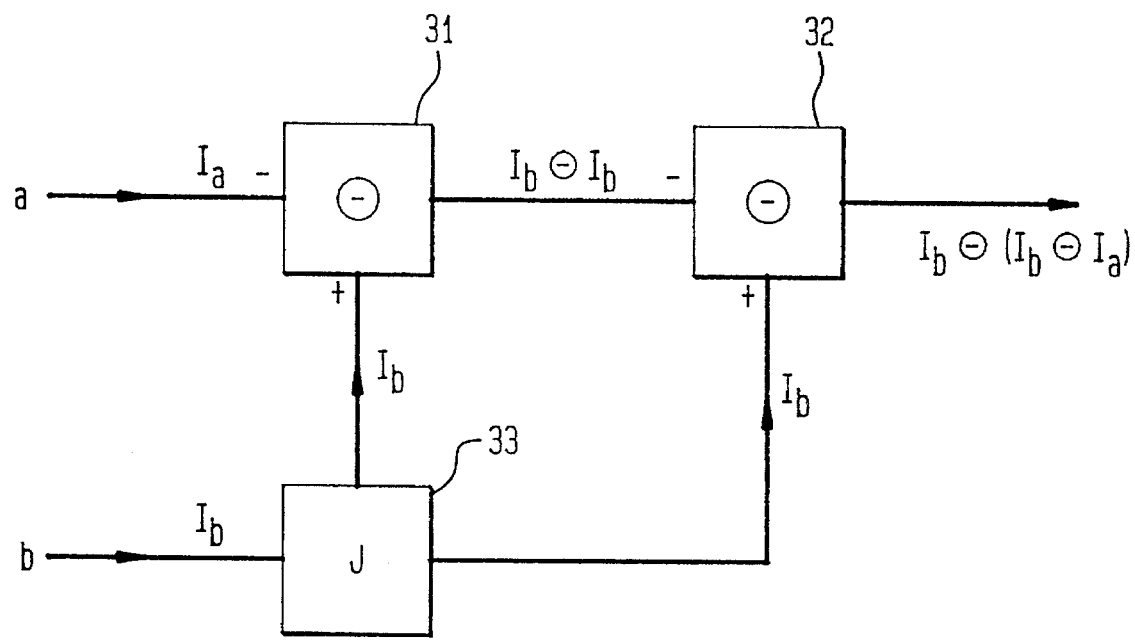
FIG. 4 shows in block schematic form the components of the circuit represented by the symbol of FIG. 3.

FIG. 4 shows in block schematic form a circuit suitable for providing the minimum function represented by symbol 30 of FIG. 3. It includes bounded difference circuits 31 and 32 similar to circuits 11 and 16 and current amplifier circuit 33 similar to current amplifier circuit 20 in the circuit arrangement of FIG. 2. Circuit 31 is connected so that it will provide as an output $I_b - I_a$ when $I_a$ is smaller than $I_b$ but otherwise zero, and this output is supplied to circuit 32 that will provide as an output $I_b$ when $I_b$ is smaller than $I_a$ and $I_b \ominus (I_b \ominus I_a)$ or $I_a$, when $I_a$ is smaller than $I_b$. The patent to Yamakawa describes other possible forms of minimum circuit 30.

The foregoing circuits are designed to utilize the amplitude of signal currents as the measure of truth or confidence in the inferences involved. Alternatively, the amplitudes of voltages can be similarly used by choice of appropriate circuitry.

In some situations, a chain of implications is involved, more than one of which includes some uncertainty so that some fuzziness is involved. The present invention is especially well equipped to handle such a chain expeditiously, particularly as compared to other schemes proposed for handling such situations.

Figure 5:
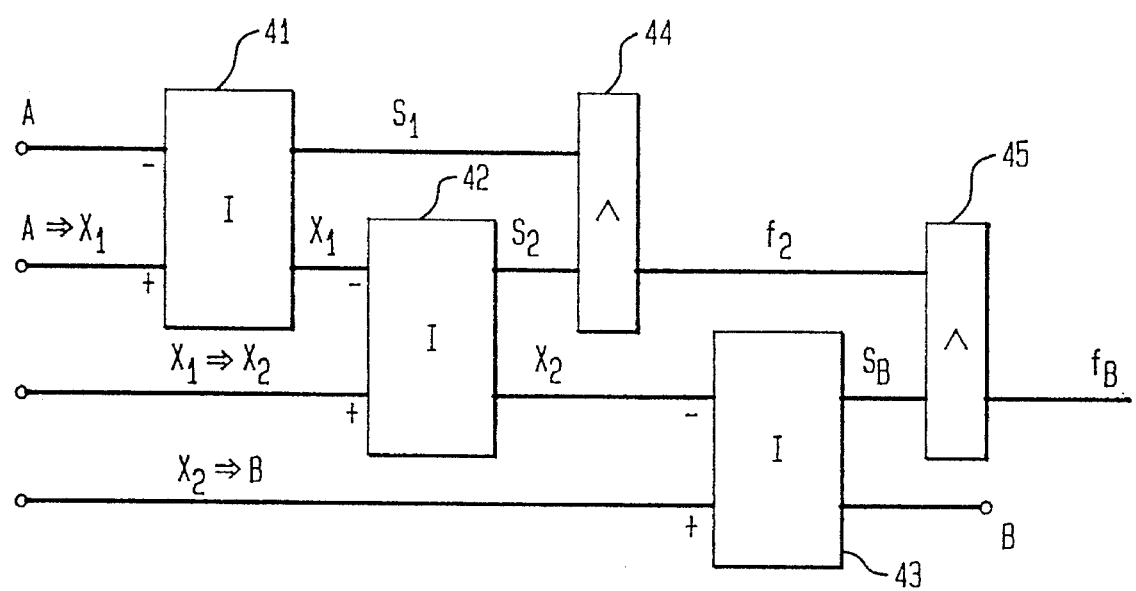
FIG. 5 shows, using the symbols of FIGS. 1 and 3, a fuzzy information system that involves a three-link chain of inferences in accordance with the invention.

In FIG. 5, there is shown a block schematic for handling a chain of fuzzy inputs, each of which has a confidence measure between 0 and 1. In particular, it is designed to handle the three-link chain $A \Rightarrow X_1, X_z \Rightarrow X_2, X_2 \Rightarrow B$ where A is the confidence in the initial or minor premise and $X_1, X_2, B$ are the confidence measures of the three implications, respectively. In such a chain, the major premise of a link in the chain serves as the minor premise of the succeeding link in the chain.

Each of inference blocks 41, 42 and 43 is of the kind shown in more detail in FIG. 2 and each of the min. circuits 44 and 45 is of the kind shown in FIG. 4. As depicted, the confidence measure of A is supplied to the negative input terminal of inference block 41, and $A \Rightarrow X_1$ which a measure of the first implication is supplied to its positive input terminal. The output $S_1$, equal to $A \Rightarrow X_1 \ominus A'$ is supplied as one input to the comparator 44. The other output of inference block 41 is applied to the negative input terminal of inference block 42 while the confidence measure of implication $X_1 \Rightarrow X_2$ is applied to its positive input terminal. The first output $S_2$ of inference block 42, equal to the $X_1 \Rightarrow X_2 \ominus X'$, is supplied as a second input to the comparator 44. The second output $X_2$ of the inference block is applied to the negative input terminal of inference block 43 along with the measure of the third implication $X_2 \Rightarrow B$ applied to the positive terminal. The first output $S_B$ of inference block 43, equal to $X_2 \Rightarrow B \ominus X'_2$, is supplied as an input to comparator 45 for comparison with $f_2$, the smaller of $S_1$ and $S_2$ and there results B as the final inference output of the chain. However, in the event that $S_1$, $S_2$ or $S_B$ are zero, or less than a specified threshold, if this is desired, $f_B$ will be zero, or less than that specified threshold, and no inference can be drawn. If each of the fidelities is positive, the smallest of these, $f_B$, will be the fidelity of the final consequent in the chain of implications. It is usually important to know this value.

It can be appreciated that the chain can be extended to include further inferences and these would be handled in an analogous fashion. It can be appreciated that the output will be the smallest of the various S terms that are formed as the first outputs of the various inference blocks where each S term is equal to the difference between the input applied to the positive input terminal of the associated inference block and the complement of the input applied to the negative input terminal.

We claim:

1. A fuzzy syllogistic inference system for performing electrically the modus ponens rule of inference involving a minor premise with a range of confidence between zero and one and major premises with a range of confidence between zero and one and calculating the confidence and fidelity measure of the consequent of the inferences comprising:

means for supplying a first electrical signal whose amplitude is in the range between 0 and 1, said amplitude representing the measure of confidence in the truth of the minor premise;

means for supplying a second electrical signal whose amplitude is in the range between 0 and 1, said amplitude representing the measure of confidence in the truth of the major premise;

first circuit means coupled for receiving the first and second electrical signals and for deriving as a fidelity measure of the consequent a third electrical signal whose amplitude is the difference between the amplitude of the second electrical signal and the complement of the amplitude of the first electrical signal, and second circuit means for deriving as the valid consequent of the inference a fourth electrical signal having the amplitude of the second electrical signal when the third electrical signal is positive.

2. A fuzzy syllogistic inference system as set forth in claim 1, where said first electrical signal and said second electrical signal are analog signals.

3. A fuzzy syllogistic inference system as set forth in claim 1, where said first electrical signal and said second electrical signal are digital signals.

4. A fuzzy syllogistic inference system for performing electrically the modus ponens rule of inference involving a minor premises with a range of confidence between zero and one and major premises with a range of confidence between zero and one and calculating the confidence and fidelity measure of the consequent of the inferences comprising:

means for supplying a first electrical signal whose amplitude is in the range between 0 and 1, said amplitude representing the measure of confidence in the truth of the minor premise;

means for supplying a second electrical signal whose amplitude is in the range between 0 and 1, said amplitude representing the measure of confidence in the truth of the major premise;

first circuit means coupled for receiving the first and second electrical signals and for deriving as a fidelity measure of the consequent a third electrical signal whose amplitude is the difference between the amplitude of the second electrical signal and the complement of the amplitude of the first electrical signal, including third circuit means for deriving the complement of the first electrical signal and fourth circuit means for subtracting said complement of the first electrical signal from the second electrical signal to derive the third electrical signal, and second circuit means for deriving as the valid consequent of the inference a fourth electrical signal having the amplitude of the second electrical signal when the third electrical signal is positive.

5. A fuzzy syllogistic inference system as set forth in claim 4, where said first electrical signal and said second electrical signal are analog signals.

6. A fuzzy syllogistic inference system as set forth in claim 4, where said first electrical signal and said second electrical signal are digital signals.

* * * * *